US012378981B2

(12) United States Patent
Amic

(10) Patent No.: US 12,378,981 B2
(45) Date of Patent: Aug. 5, 2025

(54) HYDRAULIC REGENERATION CIRCUIT WITH MULTIPLE SPEEDS

(71) Applicant: Ivan Amic, Calgary (CA)

(72) Inventor: Ivan Amic, Calgary (CA)

( * ) Notice: Subject to any disclaimer, the term of this patent is extended or adjusted under 35 U.S.C. 154(b) by 0 days.

(21) Appl. No.: 18/108,605

(22) Filed: Feb. 11, 2023

(65) Prior Publication Data

US 2023/0258206 A1 Aug. 17, 2023

Related U.S. Application Data

(60) Provisional application No. 63/309,543, filed on Feb. 12, 2022.

(51) Int. Cl.
*F15B 21/14* (2006.01)
*F15B 7/00* (2006.01)
*F15B 11/024* (2006.01)

(52) U.S. Cl.
CPC .............. *F15B 21/14* (2013.01); *F15B 7/006* (2013.01); *F15B 11/024* (2013.01); *F15B 2211/20515* (2013.01); *F15B 2211/20538* (2013.01); *F15B 2211/20576* (2013.01); *F15B 2211/3058* (2013.01); *F15B 2211/50581* (2013.01); *F15B 2211/7053* (2013.01)

(58) Field of Classification Search
CPC ................... F15B 1/024; F15B 11/024; F15B 2011/0243; F15B 2011/0246; F15B 21/14; F15B 2211/3058; F15B 2211/3133
See application file for complete search history.

(56) References Cited

U.S. PATENT DOCUMENTS

| | | | | |
|---|---|---|---|---|
| 7,444,809 B2 * | 11/2008 | Smith | F15B 11/006 | 60/413 |
| 7,596,893 B2 * | 10/2009 | Tozawa | E02F 9/2292 | 37/348 |
| 7,634,911 B2 * | 12/2009 | Brinkman | E02F 9/2217 | 91/533 |
| 8,510,000 B2 * | 8/2013 | Kawasaki | E02F 9/226 | 180/65.265 |
| 9,290,912 B2 * | 3/2016 | Wen | F15B 13/06 | |
| 10,006,368 B2 * | 6/2018 | Horiuchi | F01D 5/18 | |
| 10,822,211 B2 * | 11/2020 | Shan | F15B 11/024 | |
| 11,286,643 B2 * | 3/2022 | Ku | E02F 9/2239 | |
| 11,401,693 B2 * | 8/2022 | Kim | E02F 9/2217 | |
| 11,542,683 B2 * | 1/2023 | Kang | E02F 9/2217 | |
| 11,598,354 B2 * | 3/2023 | Jung | F15B 11/024 | |

FOREIGN PATENT DOCUMENTS

EP 0952354 A2 * 10/1999 .............. F15B 21/14

* cited by examiner

*Primary Examiner* — Michael Leslie

(57) ABSTRACT

The present disclosure shows a hydraulic regeneration circuit for a hydraulic cylinder that enables multiple extension speeds for the cylinder even while using fixed displacement pumps. The regeneration circuit uses the expelled fluid to drive a hydraulic pump/motor combination to create 4 or more speeds, as opposed to the 2 speeds typical in regeneration circuits. By using directional flow control valves, the fluid can be combined in such a way that the operator can choose a speed multiplier for the hydraulic cylinder to operate at.

17 Claims, 6 Drawing Sheets

HYDRAULIC REGENERATION CIRCUIT WITH MULTIPLE SPEEDS

CROSS REFERENCE TO RELATED APPLICATIONS

This application claims priority to and benefit of U.S. provisional Patent Application Ser. No. 63/309,543 filed on Feb. 12, 2022, which is hereby incorporated by reference.

TECHNICAL FIELD

The present disclosure generally relates to hydraulic cylinders and regeneration circuits. More specifically, it relates to machinery that use hydraulic cylinders to move a load.

BACKGROUND

Hydraulic cylinders are devices with a fixed area on the rod side and bore side. As such, the only way to vary the extension speed of a hydraulic cylinder is by varying the rate at which hydraulic fluid is supplied by the pump.

There are certain applications where a pair of hydraulic cylinders are used to lift a load. One such application is called "hydraulic hoisting" and is used on drilling/service rigs in the oil & gas industry. In this application, the engine provides power to the power-take-offs (usually in a multi-pad configuration), and the power take-off provides mechanical energy to two pumps, each pump being used to control a respective hydraulic cylinder. Synchronization of these cylinders is critical, so in practice both pumps are attached to the same driveline (and therefore the same engine). In order to maintain the synchronization without expensive monitoring equipment, the pumps used are almost always fixed-displacement piston pumps. Variable displacement pumps are generally considered unacceptable as a primary pump in this application, although some manufacturers use them as a supplementary pump along with the necessary equipment to monitor and control the cylinder position.

Due to practical considerations, there is an upper limit on the size of the engine that a service rig can use, which depends on its purpose and platform. This poses a problem when a rig needs to use large hydraulic cylinders, as the engine and pump configuration cant provide enough fluid to the hydraulic cylinder to move it at an acceptable speed during light loads. The engine has a limited range of RPM and horsepower, and the system is configured to lift the maximum load at a low speed, or rather a low rate of cylinder extension. For example, an 800-horsepower rig could be designed to lift a maximum of 250,000 pounds, and would lift this maximum weight at a slow speed. When lifting a medium loads (for example, 100,000 pounds), the engine can spin at its maximum speed and therefore turn the pump faster, which provides a moderate rate of cylinder extension.

However, design constraints of the engine place a limit on how fast it can rotate, and therefore how much fluid the pump can provide to the hydraulic cylinder. Hydraulic hoisting rigs frequently need to work with loads that are below 50,000 pounds, or even no load at all. If the engine is limited to the maximum speed at 100,000 pounds in this example, lightening the load even further will not allow for a faster movement speed of the hydraulic cylinder Machines or service rigs that move a load with a hydraulic cylinder are at a disadvantage to machines that move a load through a winch line or other method, as these methods allow for the use of variable displacement pumps, multiple displacement pumps, mechanical gearboxes, etc. As mentioned, variable displacement or multiple displacement pumps are generally considered unacceptable as a primary pump due to leakage issues, reliability issues and synchronization accuracy, while their use as a supplementary pump requires monitoring the cylinder position to a level that many consider cost prohibitive or maintenance prohibitive.

Currently this problem is difficult to resolve because of a combination of factors: the engine limitations, the need for accurate synchronization of the hydraulic cylinders without an expensive monitoring system, and the impracticality of pumping such a large volume of fluid through control valves. Although some manufacturers that have found a solution, these solutions have gained limited acceptance.

In U.S. Pat. No. 10,519,725 B2, the invention attempts to solve this problem by using a hydraulic cylinder using multiple chambers. By diverting the fluid to one or more of the chambers, the hydraulic cylinder can be moved at different extension speeds for any given pump or motor speed. However, practical issues have prevented widespread use of such an arrangement.

In U.S. Pat. No. 8,453,762 B2, the invention attempts to solve this problem by using a variable pump in the regeneration circuit. If two hydraulic cylinders were used, such a configuration would require extensive monitoring of both cylinder positions in real time, and an accurate control system to correct any deviations. The industry demands to have a simpler system to prevent the extensive maintenance and costs that come with such a system.

FIG. 7 shows prior art of hydraulic amplification circuits. These types of hydraulic circuits are known to persons skilled in the art. These types of circuits are designed to provide fast extension or retraction of the hydraulic cylinder under a low load or zero-load condition. However, these types of circuits do not use the regeneration flow itself as the driving force. Additionally, these types of circuits do not allow for hydraulic amplification while at a low but still substantial load. This is significant because the size of the pumps used in these hydraulic hoisting systems are very large, and often there are multiple pumps acting in unison to power a single cylinder. To use the sort of hydraulic circuit outlined in FIG. 7 would require the pumps to become so large as to be cost prohibitive. Furthermore, this hydraulic hoisting application does not benefit from having only a fast gear that operates under near-zero load, while not having a gear that can handle light but substantial loads (ie. 50,000 pounds as mentioned in the previous example).

To make a hydraulic amplification circuit suitable for the application, it must be driven by the regeneration fluid alone, therefore allowing the use of smaller pumps and motors. Additionally, there must be a rapid speed under near zero load, and a fast speed under a light load. The novelty of the invention is that these conditions are achieved through an energy exchange (ie. the exchange of fluid volume and fluid pressure) between the pumps and motors, rather than the selective operation of additional pumps when the operator chooses, the latter being a description of the hydraulic amplification circuits typically seen.

SUMMARY OF THE INVENTION

The present invention allows multiple speeds in the hydraulic system/hydraulic cylinders beyond what either a regeneration circuit or hydraulic amplification circuit can produce. The novelty lies in ability to do so while using fixed displacement pumps and being driven solely by the fluid expelled from the hydraulic cylinder.

It is common for hydraulic systems to have a regeneration circuit that allows a few different speeds of cylinder extension. If one wishes to supplement this flow, it must be done with a secondary source, and that secondary source must be controlled to match the primary source. This invention uses a hydraulic motor that is coupled to and drives a hydraulic pump. The hydraulic motor is driven by the fluid expelled from the hydraulic cylinder, thus the hydraulic pump adds a volume of fluid to the circuit that is directly proportional to the volume of fluid expelled from the hydraulic cylinder during operation. The hydraulic pump has an inlet from a source that is not directly feeding the hydraulic cylinder, but the outlet does feed into the hydraulic cylinder (or hydraulic circuit). This pump does not need to be externally regulated to match the speed of the primary pump because its speed is locked to the speed of the hydraulic motor, which is (effectively) locked to the speed of the hydraulic cylinder, which is (effectively) locked to the speed of the primary pump or group of pumps.

The hydraulic cylinder will expel fluid while it is moving, and this fluid is harnessed into a typical regeneration system. But this expelled fluid can also be directed into a hydraulic motor that is mechanically coupled to a hydraulic pump. The expelled fluid will turn the motor and thereby turn the pump, and the pump will add fluid to the hydraulic circuit or system.

A person skilled in the art can calculate the system in such a way so that (even when accounting the load being lifted by the hydraulic cylinder) the fluid expelled from the cylinder can provide enough energy to turn the pump & motor, thereby pressurizing fluid through the pump to the line pressure while depressurizing the fluid through the motor to an equal line pressure, then adding either or both fluids into the main line or hydraulic cylinder at the same line pressure. Effectively, the hydraulic cylinder or hydraulic circuit sees a net gain in fluid flow, and the fluid is directly controlled by the movement of the hydraulic cylinder, thereby avoiding any external regulation mechanisms.

DETAILED DESCRIPTION

The invention enables multiple speeds of cylinder extension by adding additional fluid to the hydraulic circuit in proportion to the flow being provided by the primary pump. The hydraulic cylinder extends as pressurized fluid is applied from the primary pump to the bore-side of the cylinder, thus the bore-side is filled and the fluid in the rod-side is expelled by the piston movement. Normally, said fluid is drained into the hydraulic tank. Optionally, said fluid can be piped back into the bore-side of the hydraulic cylinder to create a classic regeneration scenario where the cylinder extends slightly faster. This allows a normal hydraulic cylinder to have 2 speeds.

The present invention adds an additional 2 pathways for fluid regeneration. It allows the regeneration of more fluid than there is present on the rod-side of the cylinder through the use of a secondary pump. This in turn allows the hydraulic cylinder to extend more quickly than would be possible with classic regeneration. Any one of these pathways can be actively selected by the operator at the control panel, thereby allowing the cylinder to move at 4 different speeds as selected by the operator.

Figure 1:
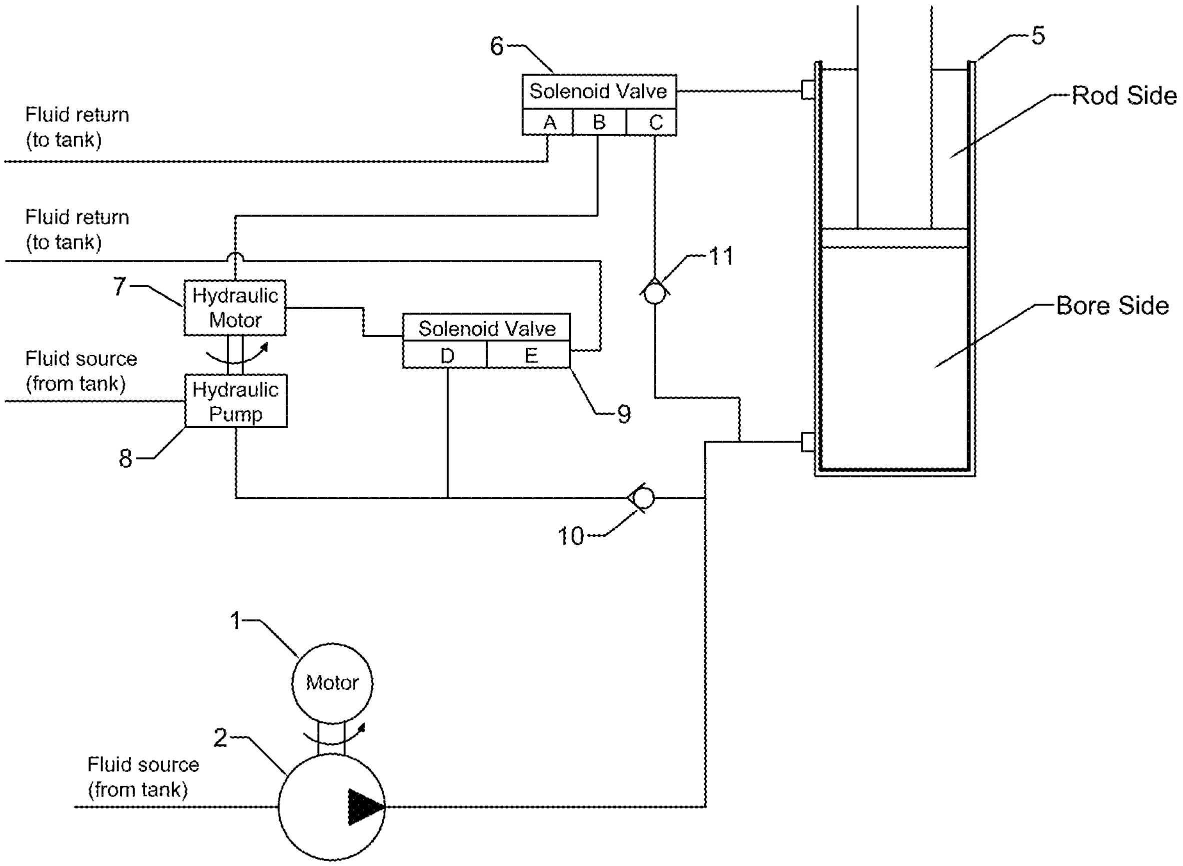
FIG. 1 provides a conceptual understanding of the invention. For the sake of clarity, it is presented as an addition to any hydraulic cylinder and the associated circuit. All parts of the circuit not associated with the invention have been intentionally left out.

FIG. 1 shows the proposed regeneration circuit connected to a hydraulic cylinder 5 as a conceptual model. Peripherals such as relief valves, etc. are standard addons to any hydraulic circuit and are not shown. The figure also doesn't show the circuit for retracting the cylinder, as it is irrelevant to the invention, although it would be required in an actual installation.

A typical hydraulic cylinder used in a hydraulic hoisting application has an 8" bore and a 7" rod, which gives a cylinder ratio of 4.25:1. For purposes of illustrating the invention, let us assume a generic 4:1 cylinder ratio—that is to say, the surface area of the bore-side of the hydraulic cylinder is 4 (A) and the surface area of the rod-side is 1 (A). This does not limit the invention to such a cylinder or ratio, but only serves as an illustration.

Without any regeneration, the motor 1 will turn the primary hydraulic pump 2 to provide fluid to the bore side of the hydraulic cylinder 5. The hydraulic cylinder with will extend, and expel fluid from the rod side. At this point, we are presented with various options of where the expelled fluid from the rod side can go.

If the hydraulic cylinder 5 is extending and solenoid valve 6 is activated to position A, the hydraulic fluid expelled from the rod-side of the cylinder 5 will be directed to the tank. No regeneration takes place, and the hydraulic cylinder would move at a speed ratio of 1.0.

If the hydraulic cylinder 5 is extending and solenoid valve 6 is activated to position C, the hydraulic fluid expelled from the rod side flows through check valve 11 and supplements the fluid from the primary pump 2 (that is to say, it combines/adds with this fluid). This combined fluid then flows into the bore-side of hydraulic cylinder 5. This creates a classic regeneration scenario that is well known in the industry. Since the cylinder ratio is 4:1, that means that the primary pump 2 will fill the bore side of the hydraulic cylinder 5 with 4 units of fluid, while regeneration fills the bore side of the cylinder 5 with 1 unit of fluid, making a total of 5 units of fluid in the bore-side. The primary pump 2 provided 4 units of fluid, but the bore side of the hydraulic cylinder 5 received 5 units of fluid. This gives a speed ratio of 5/4=1.2. This is more fluid than the primary pump 2 could supply on its own.

If solenoid valve 6 is set to position B, the fluid from the rod side of cylinder 5 is forced to go through a hydraulic motor 7. This hydraulic motor is mechanically coupled to a hydraulic pump 8. The fluid that exists from the hydraulic motor 7 will go into another solenoid valve 9 where pathway D or E can be selected. Should the solenoid valve 9 be set to pathway E, the fluid exhausting from the motor 7 will go to the tank while the fluid from the driven hydraulic pump 8 will continue on towards the check-valve 10. Alternatively, the solenoid valve 9 can be set to pathway D, so that the fluid from both the motor 7 and the pump 8 will combine before continuing towards the check-valve 10. This decision will change the amount of additional fluid that reaches the check valve 10, and therefore the amount of additional fluid pumped into the bore of the hydraulic cylinder 5. This will change the effective speed of the cylinder 5.

The fluid that reaches the check valve 10 will only go through the valve 10 if the pressure of said fluid is greater than or equal to the pressure supplied by the primary pump 2 to the bore-side of the hydraulic cylinder 5. This means that the secondary pump 8 must produce flow at said pressure. This will be achieved by a buildup of pressure on the inlet side of the hydraulic motor 7, which is effectively a buildup of pressure on the rod-side of the hydraulic cylinder 5. For example, If the pressure on the bore-side of the cylinder 5 is 1000 psi, the pressure on the rod-side may be 2000 psi or more in order to make the motor/pump 7/8 combination turn and begin the regeneration. Actual values will vary based on the parameters of the specific circuit.

In the previous example of a 4:1 hydraulic cylinder, it is possible to size the hydraulic motor 7 to handle the expected flow rate of fluid coming from the rod side of the cylinder 5, and the secondary pump 8 is sized to be 1.5 times larger than this motor 7. It should be noted that this is only an example and various sizing ratios are possible.

If solenoid valve 6 is set to position B and solenoid valve 9 is set to position E, the fluid exiting the hydraulic motor 7 will not mix with the fluid exiting the secondary hydraulic pump 8. Rather, the fluid from the motor 7 will exit with zero pressure and will return to the tank. The fluid expelled from the rod side of the cylinder 5 will go into the hydraulic motor 7, and will force the motor/pump 7/8 combination to turn so that the secondary pump 8 produces an amount of fluid that is a multiple of the fluid going into the motor 7, as determined by the sizing ratio between said motor 7 and pump 8. In order to flow through the check valve 10, the fluid pressure produced by this secondary pump 8 must be equal to the pressure produced by the primary pump 2. When this is achieved, the flow going past check valve-10 will combine with the flow from the primary pump 2 and flow into the hydraulic cylinder 5. In short, this flow is "supplementing" the flow from the primary pump 2.

Continuing with the previous example of a 4:1 ratio cylinder, the secondary pump 8 is producing 1.5 times the amount of fluid that goes through the motor 7 (ie 1.5 times the amount of fluid expelled from the rod-side of the cylinder 5). In order to achieve this, the pressure on the rod-side of the cylinder 5 (and therefore the pressure of fluid entering the motor 7) would be 1.5 times the pressure on the bore-side of the cylinder 5, because that is the volume ratio between the secondary pump 8 and the hydraulic motor 7. Between this motor 7 and pump 8, greater pressure with low volume is exchanged for greater volume at a low pressure. The primary pump 2 will supply 4 units of fluid to the bore-side of the cylinder 5. The rod side of said cylinder will expel 1 unit (since it is a 4:1 ratio cylinder). The secondary pump 8 will supply 1.5 times the 1 unit expelled by the rod side of the cylinder 5, namely 1.5 units of fluid, for a total of 5.5 units of fluid going into the bore side of the hydraulic cylinder 5. The bore side of the cylinder 5 has received 5.5 units of fluid while the primary pump 2 has provided 4 of those units, therefore the speed ratio of the cylinder becomes 5.5/4=1.375.

If solenoid valve 6 is set to position B and solenoid 9 is set to position D, the fluid exiting the hydraulic motor 7 and secondary pump 8 will combine. By definition, the pressure required to open check valve 10 is equal to the pressure provided by the primary pump 2, which is equal to the pressure in the bore side of the cylinder 5. This means that the inlet of the hydraulic motor 7 will receive high energy fluid being expelled from the rod side of the cylinder 5, and at the outlet of the hydraulic motor 7 will exhaust fluid that is at the pressure provided by the primary pump 2. Likewise, pump 8 will take fluid from the tank (pressure is 0), or from a source with a moderate charge pressure, or even from a charged accumulator, and will pressurize this fluid to produce flow at a pressure equal to that of the primary pump 2. Effectively, the hydraulic motor 7 has taken some of the energy from the fluid going into it and converted it to work at the pump 8. Continuing the previous example of a 4:1 cylinder, 1 unit of flow will enter and exit the hydraulic motor 7 while the secondary pump 8 will create another 1.5 units of flow (this is the volume ratio between the secondary pump 8 and the motor 7). This 2.5 units of combined flow will flow past check valve 10 and combine with (ie. supplement) the fluid from the primary pump 2. This combined fluid then goes into the bore of the hydraulic cylinder 5. This means that 2.5 units of fluid have been provided by the motor/pump 7/8 combination. The primary pump 2 has provided 4 units of fluid while the hydraulic cylinder 5 has received 6.5 units of fluid. Therefore, the speed ratio is 6.5/4=1.625.

The flow (and pressure) required to turn the hydraulic motor 7 comes from the expelled fluid from the rod side of cylinder 5, as said cylinder is extended. This means that the pressure on the rod-side of the cylinder 5 will be greater than the pressure on the bore side. Theoretically, the pressure ratio between the rod side and the bore side of the hydraulic cylinder 5 will be the same as the volume ratio between the secondary pump 8 and the hydraulic motor 7. If using positive displacement pumps/motors (ie. piston pump/piston motor), the inefficiencies inherent in the equipment cannot translate into flow losses, but they do translate into a pressure ratio that is higher than the theoretical ratio. The fact that the rod side of the cylinder 5 has a greater pressure than the bore side also means that the cylinder has a reduced lifting capacity. This is considered an acceptable tradeoff because the load being lifted while using a "fast gear" is low.

Figure 2:
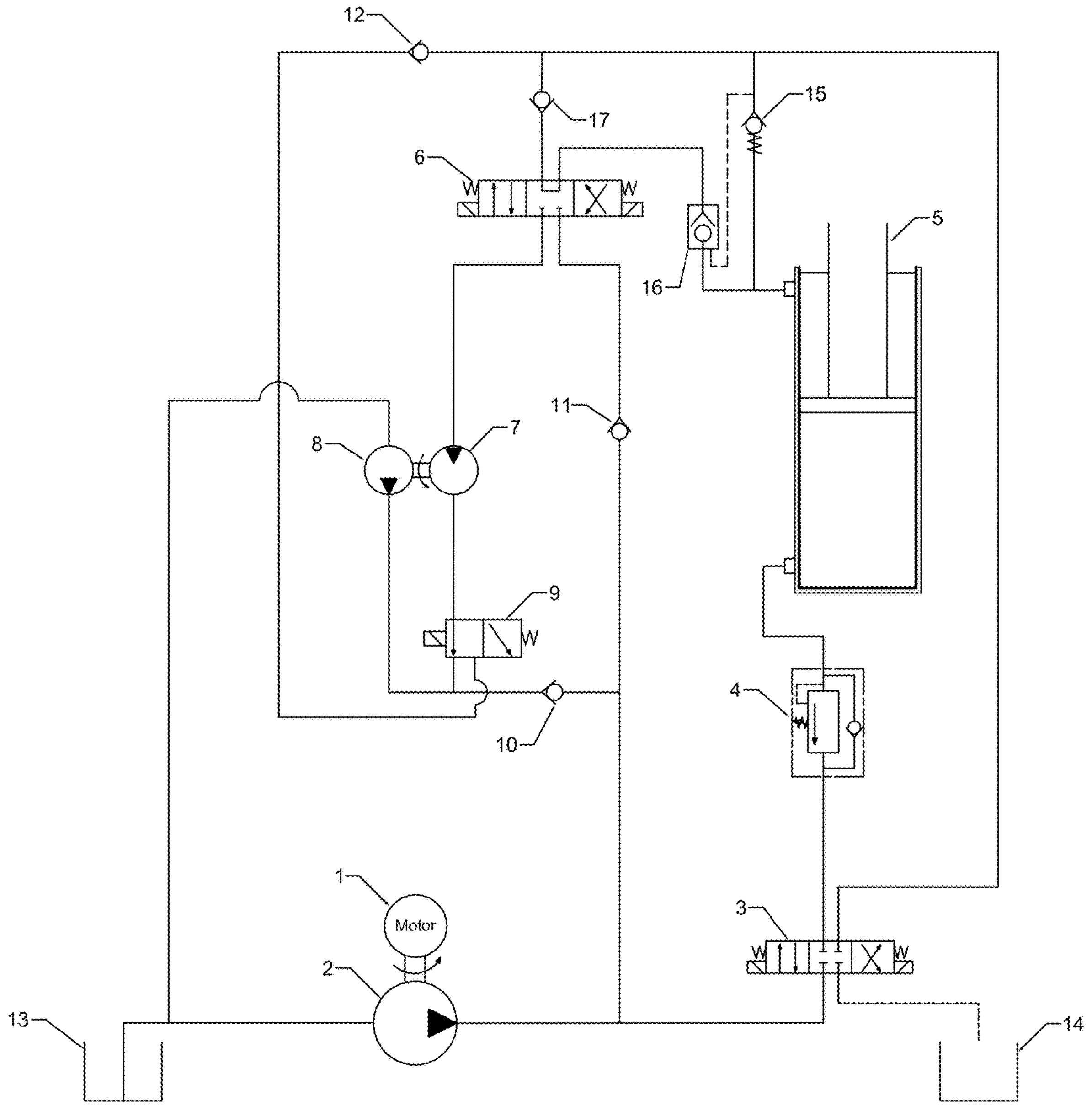
FIG. 2 presents the preferred embodiment of the invention as a hydraulic circuit diagram.

FIG. 2 presents the preferred embodiment of the invention as a hydraulic schematic.

The motor 1 turns the primary pump 2 and provides flow to the circuit. Primary pump 2 is receiving hydraulic fluid from the tank 13. This flow from pump 2 goes through a directional control valve 3. There are many different possibilities that can be used in place of valve 3, and is dependent on the application.

The flow then goes through a counterbalance valve 4, although this is optional equipment that may or may not be present in a real application. There may also be other components that are present in a real-world application but are not listed in FIG. 2.

The flow goes through counterbalance valve 4 and into the bore side of the hydraulic cylinder 5. This extends the hydraulic cylinder 5 and expels the fluid on the rod side of said cylinder.

This exhausted fluid cannot go through check valve 15, since that valve will only open if directional control valve 3 is set to a reverse setting and attempts to retract the hydraulic cylinder 3. The fluid will instead go through check valve 16, which is a pilot-operated check valve that is normally open. The pilot on this valve 16 is connected to the retraction pathway from the directional valve 3. Because check valve 15 is spring loaded, pressure will build up in the case of cylinder retraction and will shift valve 16 closed while valve 15 allows flow. However, during cylinder extension, the pressure of the line leading up to check valve 15 will be almost zero and check valve 16 will stay open. The fluid will then flow into a solenoid activated directional valve 6, although it can be seen from the various figures that many different types of directional control valves are possible.

If directional control valve 6 is left in the center position, the flow will go through check valve 17 and will return to tank. This is a case of zero-regeneration, or effectively "speed 1".

If directional control valve 6 is set to the flow-through configuration, then fluid is pumped through check valve 11 and is pumped to the hydraulic cylinder 5 to act as supplemental flow for the primary pump 2. Note that this flow can be connected directly to the hydraulic cylinder 5, or before the counterbalance valve 4, or before the directional control valve 3. This case creates a classic case of regeneration and is effectively "speed 2"

If directional control valve 6 is set to the cross-flow configuration, the flow will go to hydraulic motor 7. This hydraulic motor 7 is mechanically connected to the hydraulic pump 8 and will cause it to turn. Directional valve 9 allows the operator to select whether flow from the hydraulic motor 7 will combine with the flow from the hydraulic pump 8, or whether the flow from the motor 7 will return to the tank 14. If directional valve 9 is set to the diverter position, the flow from motor 7 will go through check valve 12 and into tank 14, while the flow from pump 8 will go through check valve 10 and into the hydraulic cylinder 5 to supplement the flow from the primary pump 2. This condition produces more supplemental flow than classic regeneration, but not as much as the circuit is capable of, so it is "speed 3".

If directional valve 9 is set to the flow through position, the flows from the motor 7 and pump 8 will combine, and this combined flow will pass through check valve 10 and connect to the main line to supplement the flow from the primary pump 2. This is the maximum amount of supplemental flow the circuit can produce and is "speed 4".

Figure 3:
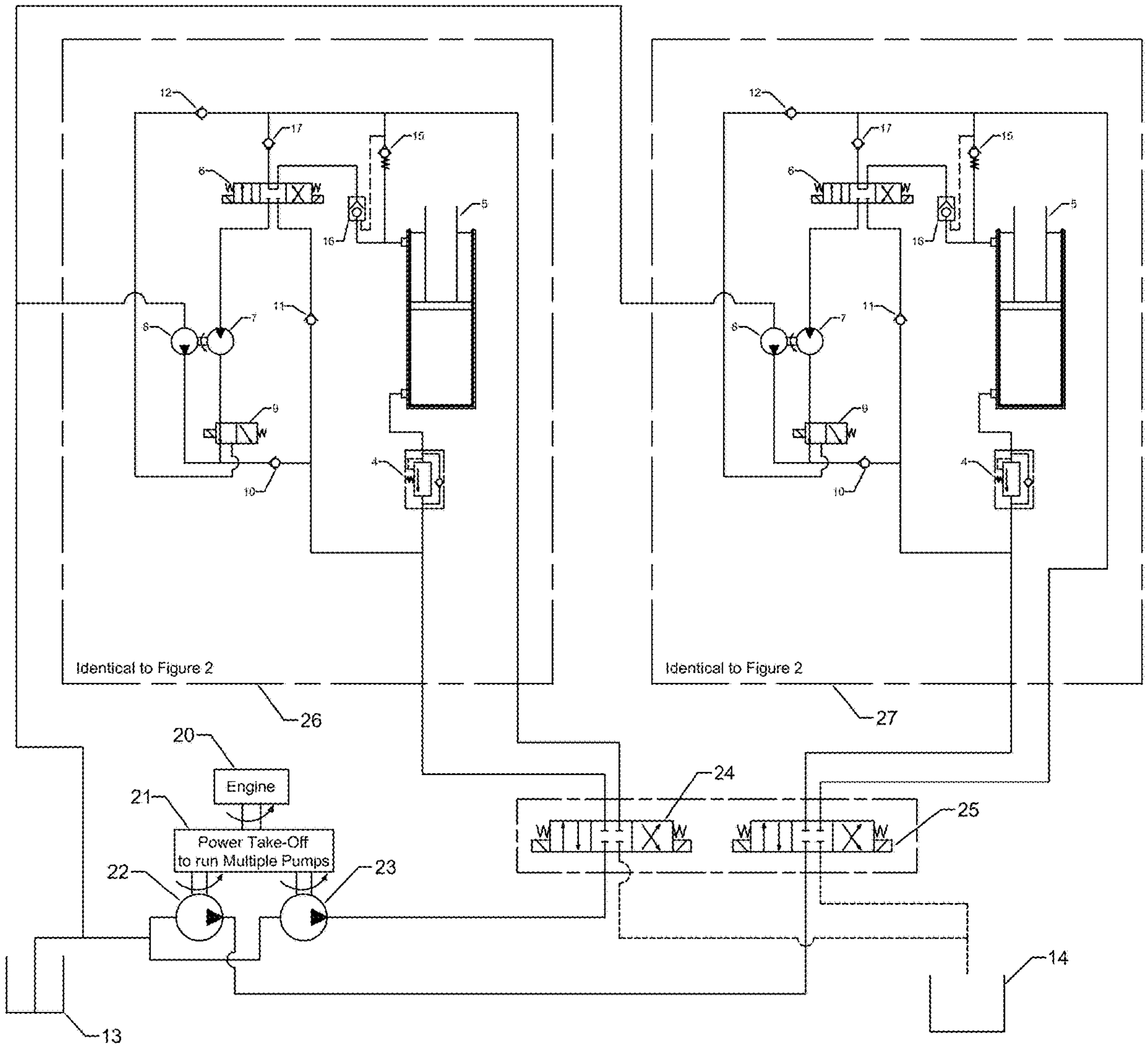
FIG. 3 presents an application of the preferred embodiment. This circuit would be suitable for use on a hydraulic hoisting rig and would maintain synchronization between the cylinders, although it is likely that various changes and additions would be made by the designer to suit the application.

FIG. 3 presents an application of the preferred embodiment of the invention as a hydraulic schematic. This schematic could be used in a hydraulic hoisting application. In this circuit, there are two hydraulic cylinders that are identical, and the hydraulic circuits to run each of them are identical. For simplicity, these hydraulic cylinders plus associated circuitry are labeled as blocks 26 and 27 and they are identical. The schematic inside of each of these blocks is taken directly from FIG. 2.

There is a large diesel engine 20 that connects to a power-take-off or multi-pump gearbox 21. This gearbox can usually run more than just 2 pumps, but that is all that is relevant to this figure. Gearbox 21 runs pump 22 and 23 in synchronization and both pumps produce identical flow into their respective lines and hydraulic cylinders 5.

The flows from pump 22 and 23 go into solenoid activated directional valves 25 and 24 respectively. While these 2 directional valves are distinct, they are wired to act in unison in order to maintain cylinder synchronization, thus they are represented as a packaged block in the figure.

After fluid passes through directional control valves 24 and 25, each hydraulic circuit acts as the circuit outlined in FIG. 2. Since the circuits are identical, both hydraulic cylinders 5 will move in a synchronized manner.

Figure 4:
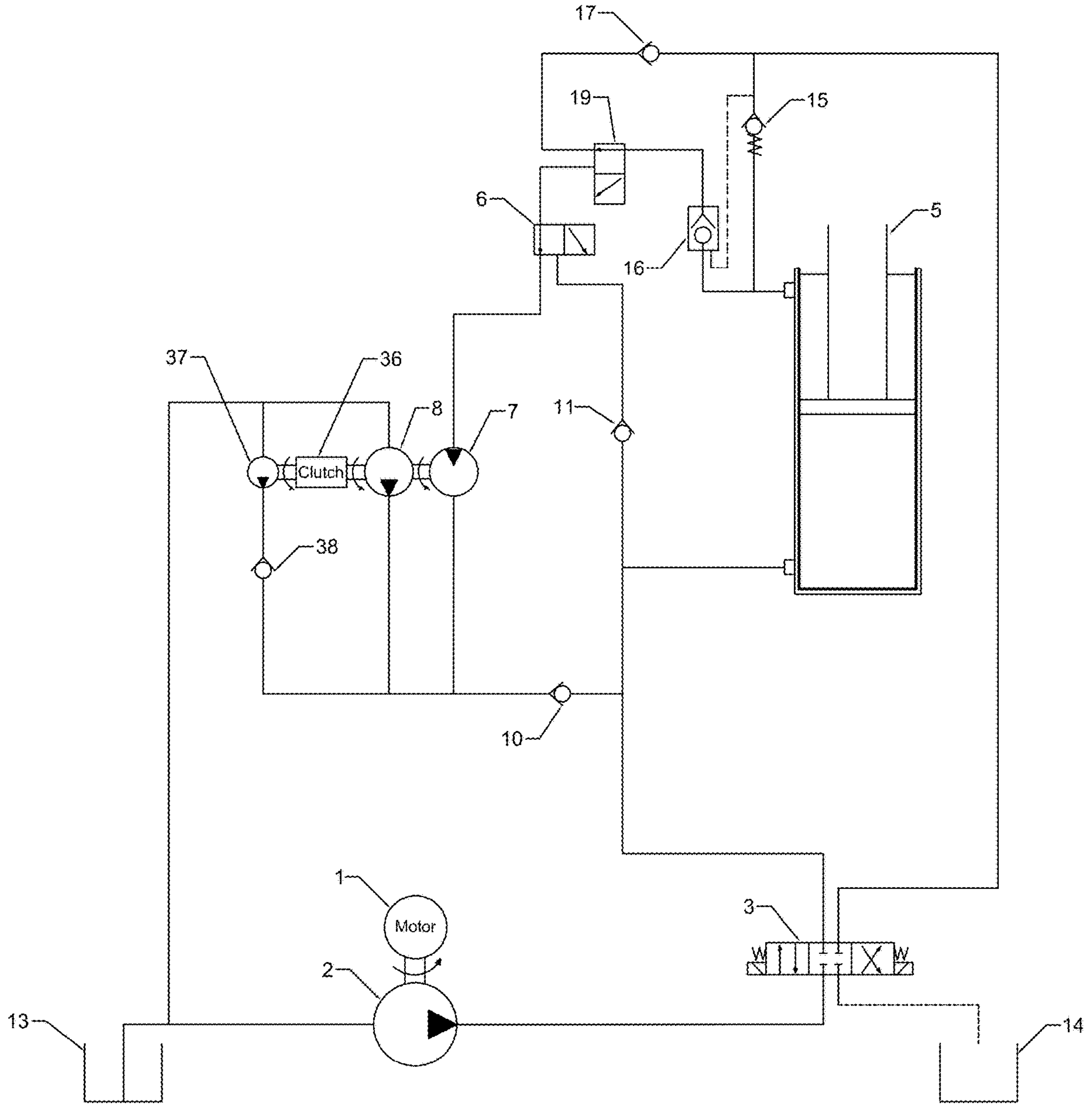
FIG. 4 presents an alternate embodiment that uses multiple pumps and a mechanical means to provide gear selection.

FIG. 4 presents a hydraulic schematic for an alternate embodiment of the invention. In this embodiment, multiple valves of unspecified type with actuation of unspecified type are used to control the flow path of the hydraulic fluid. The unspecified nature demonstrates that there are many types of valves, actuators, and flow path configurations that can be used to achieve the same result. Additionally, one of the pumps is mechanically engaged/disengaged by means of a clutch, with the possibility of this engagement/disengagement being provided by hydraulic, pneumatic, or mechanical means.

In FIG. 4, the motor 1 drives the primary pump 2. The hydraulic fluid flows through the directional control valve 3 and goes into the bore side of the hydraulic cylinder 5. The cylinder extends and expels fluid from the rod side of the cylinder. This expelled fluid cannot flow past check valve 15, and is forced to take a path through the normally-open pilot-operated check valve 16.

At this point, the fluid goes to directional control valve 19. This directional control valve 19 can be of various type-a 3-way ball valve, a solenoid actuated spool valve, etc. This valve can be actuated by various means when a "speed" is selected by the operator.

In this schematic, if the directional control valve 19 is actuated to the flow-through position, the fluid will pass through check valve 17 and return to tank. There is no regeneration in the circuit ("speed 1")

If valve 19 is actuated to the diverted flow position, the fluid will move towards directional valve 6. If this directional valve 6 is actuated to divert flow, fluid will go through check valve 11 and will supplement (ie. combine with) the flow from the primary pump 2. This combined fluid will go into the bore side of the hydraulic cylinder 5, and create a case of classic regeneration. This would be the "speed 2"

If directional control valve 19 is actuated to the diverted flow position, and directional control valve 6 is actuated to the flow through position, then the flow will continue on to the hydraulic motor 7. This hydraulic motor 7 is mechanically coupled to the secondary hydraulic pump 8, and is also coupled to the auxiliary hydraulic pump 37 via a clutch 36. If this clutch is disengaged, then auxiliary pump 37 will not rotate and won't provide fluid. Assuming the clutch 36 is disengaged, whether through mechanical, pneumatic, or hydraulic means, then the flow exiting the hydraulic motor 7 will combine with only the flow exiting the secondary pump 8. This combined flow will go through check valve 10, and will supplement the flow from the primary pump 2. The circuit now has more fluid in it than is normally available from the primary pump 2, but not as much would be available if pump 37 was engaged, therefore this is "speed 3".

It is possible to create a "speed 4" from this system by engaging clutch 36 to activate the auxiliary pump 37. In such a case, fluid would flow into the hydraulic motor 7, which would turn the secondary pump 8 and as well as the auxiliary pump 37. The flows from all three devices (the hydraulic motor 7, the hydraulic pump 8, and hydraulic pump 37) would combine and flow past check valve 10. This flow would supplement the flow from the primary pump 2 and go into the bore side of the hydraulic cylinder 5. The bore side of the hydraulic cylinder 5 now has more flow than the primary pump 2 could provide, and is the maximum flow that the system can provide (ie. "speed" 4)

As in the previous figures, retraction of the cylinder is done by actuation directional control valve 3 to a cross flow position. This allows flow to go through check valve 15, while building up enough pressure to close the pilot operated check valve 16.

Figure 5:
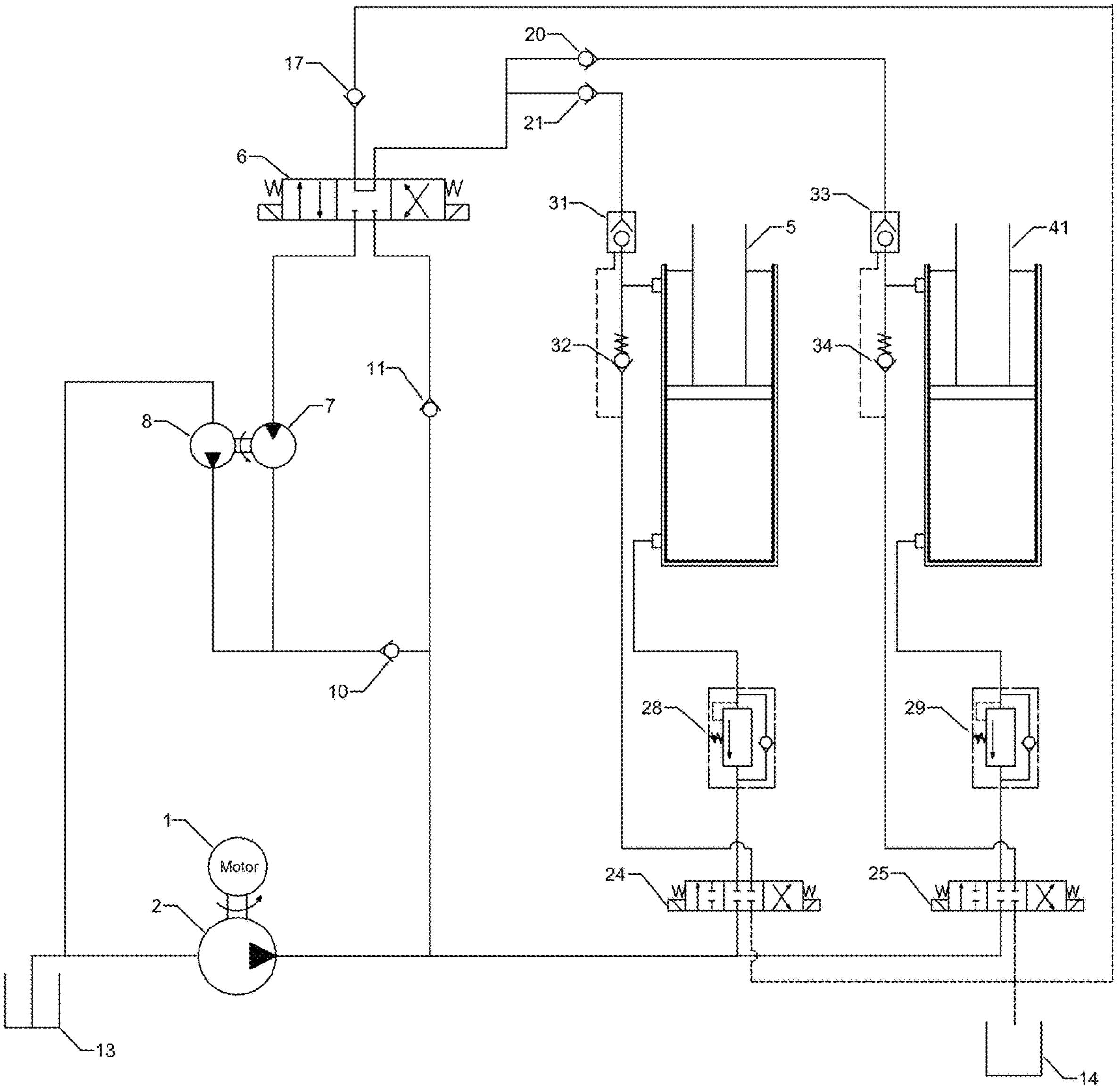
FIG. 5 presents an alternate embodiment where the entire circuit is receiving additional fluid from the present invention and thus the entire circuit receives the capability of multiple speeds. Each cylinder operates independently, but all of the cylinders receive the benefits. The cylinders do not have to be identical.
Figure 6:
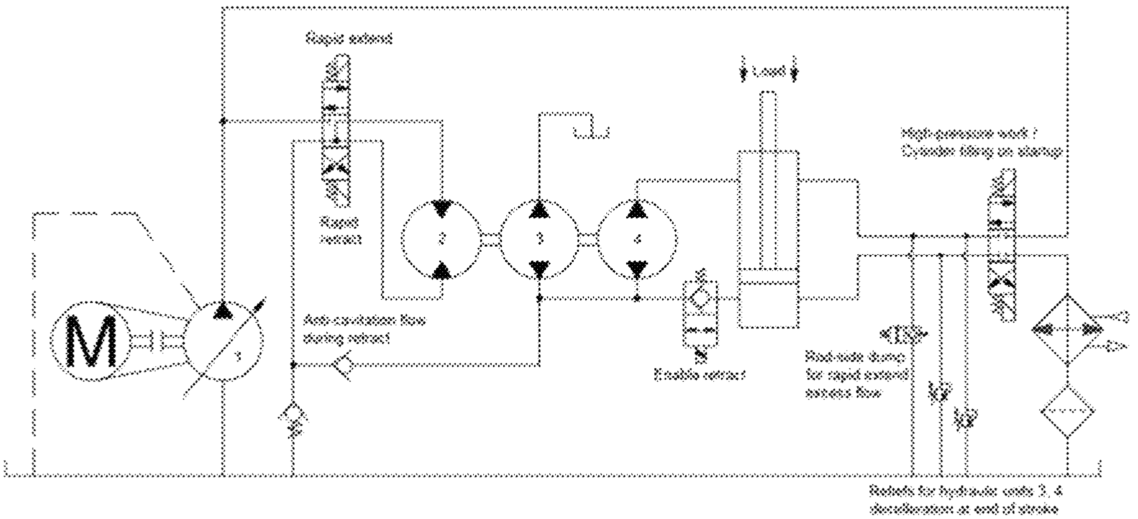
FIGURE 6 PRIOR ART
FIG. 6 shows prior art of a hydraulic amplification circuit. Circuits such as this are known to persons skilled in the art.
Figure 6:
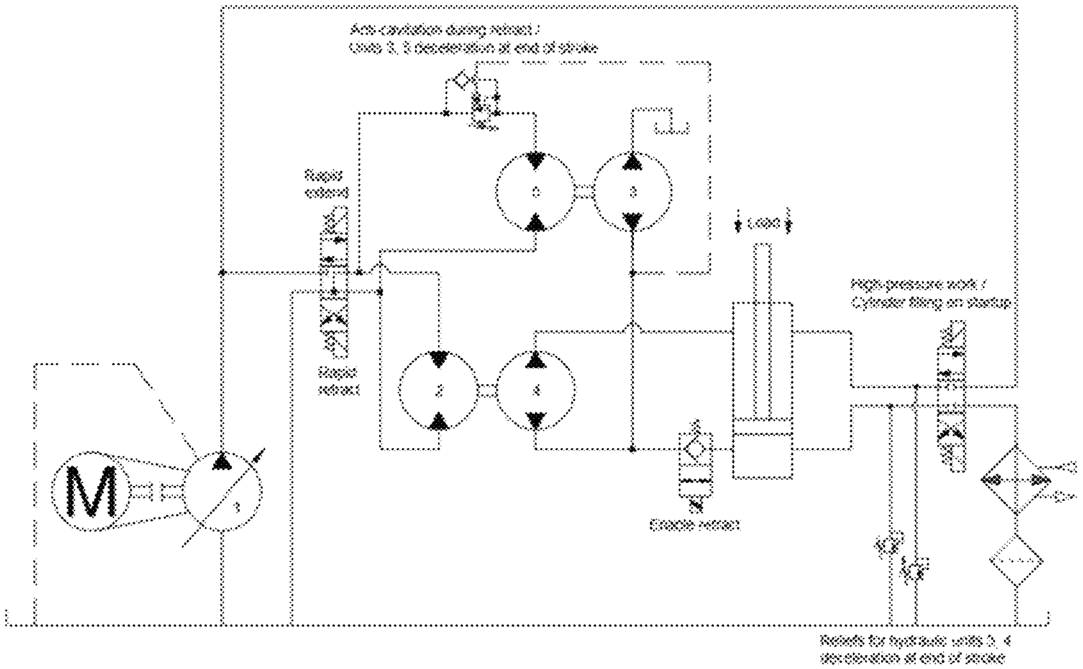
FIGURE 6 PRIOR ART

FIG. 5 presents an alternate embodiment where two or more hydraulic cylinders can be operated independently, and still receive the benefits of multiple speeds that the invention provides. The cylinders can be of different sizes and configurations, they can have differing orifice plates or flow limiters to control the flow, or any other combination of devices applicable to individual operation of cylinders. Whatever the configuration of the cylinder, it will receive a multiple of the fluid flow that would normally go into it, depending on which speed is selected by the operator.

The motor 1 drives the primary hydraulic pump 2. The pump 2 provides flow to the circuit and this flow is controlled independently by control valves 24 and 25. These valves can be of any configuration, including lever-operated valves that throttle the flow volume. These valves can even operate at the same time, as desired by the operator.

The fluid from control valve 24 flows through the (optional) counterbalance valve 28 and goes into the bore side of hydraulic cylinder 5, while fluid from control valve 25 flows though the (optional) counterbalance valve 29 and goes into the bore side of hydraulic cylinder 41.

As hydraulic cylinder 5 extends, fluid is expelled from the rod side of the cylinder and is forced past the pilot operated normally open check valve 31, as well as the check valve 21. A similar situation happens with cylinder 41, with the expelled flow going through check valve 33 and check valve 20, respectively.

The flow going past valves 20 and 21 will go into directional control valve 6. If only one cylinder is active, only the flow expelled by that cylinder will reach directional control valve 6. If both cylinders are active, then the flows expelled from the rod side of both cylinders will combine and will go into directional control valve 6. If there are more than 2 cylinders, these additional cylinders will have similar equipment and flow paths to the two cylinders already outlined, and the flows from all cylinders will combine at directional control valve 6.

Directional control valve 6 can send the fluid back to tank (no regeneration-"speed 1"), or it can send the fluid through check valve 11 to supplement the flow of the primary pump 2, thus creating a classic regeneration scenario ("speed 2").

Alternatively, directional control valve 6 can send the fluid into the hydraulic motor 7, which is mechanically coupled to hydraulic pump 8. These flows exiting the motor 7 and the pump 8 will combine and go past check valve 10 to supplement the flow of the primary pump 2 and create "speed 3"

There is no "speed 4" in this schematic, but it could be achieved if a flow diverting valve is placed after the hydraulic motor 7.

The usefulness of this embodiment is that all components of the system can benefit from regeneration. It is possible to design the system in such a way that only the largest component creates regeneration, but smaller components can claim the benefit of this regeneration. A person skilled in the art could make a system that is more complex than the one shown and use one or a few of the cylinders to provide increased speed to other unrelated elements. These additional elements do not even need to be hydraulic cylinders ie. fast charging an accumulator, increasing the speed of a motor doing work somewhere in the circuit, etc.

The invention claimed is:

1. A hydraulic system or hydraulic circuit comprising of a. one or more hydraulic cylinders actuated by the flow of a primary hydraulic pump b. at least one hydraulic motor that will receive expelled fluid from said hydraulic cylinders thereby causing said motor to rotate c. at least one hydraulic pump connected to said hydraulic motors in such a way so that rotation of said hydraulic motors causes rotation of said hydraulic pumps d. one or more flow control devices to select the flow entering the said hydraulic pumps and motors, or regulate the volume of fluid entering said hydraulic pumps and motors e. one or more flow control devices, either as separate entities or as a part of said flow control devices which select said flow entering said hydraulic pumps and motors, which select the flow exiting said hydraulic pumps and motors or regulate the amount of fluid exiting said hydraulic pumps and motors f. the fluid exiting said hydraulic pumps and motors can be selectively retained, combined or discarded via the said flow control devices g. said fluid that is retained or combined is reintroduced into said hydraulic cylinder or cylinders either directly, or indirectly via the hydraulic circuit, wherein the flow control devices are arranged in such a way that the manipulation of these flow control devices enables three or more flow rates of the said fluid that is retained or combined, for any given flow rate of the primary hydraulic pump, wherein the creation of one or more of the flow rates of the said fluid that is retained or combined involves the discarding of fluid from one or more of the said hydraulic pumps or motors, wherein the said fluid that is retained or combined adds to the fluid provided by the primary pump, and this addition produces a greater total flow rate to the said hydraulic cylinders as compared to that provided by the primary pump alone, and wherein the said fluid that is retained or combined does not pass through another hydraulic pump after exiting from said pumps connected to said motors until it is reintroduced into said hydraulic cylinders either directly, or indirectly via the hydraulic circuit.

2. The hydraulic circuit in claim 1, wherein at least one of the said hydraulic motors that receive expelled fluid or the pumps coupled to said motors that receive expelled fluid, is a fixed-displacement type.

3. The hydraulic circuit in claim 1 wherein all of the said hydraulic pumps and motors are a fixed-displacement-piston type.

4. The hydraulic circuit in claim 2, wherein all of the said flow control devices are solenoid activated directional control valves.

5. The hydraulic circuit in claim 1, wherein the flow of said hydraulic fluid that is exiting said hydraulic pumps and motors is selectively retained or discarded, and said retained flow is returned to said one or more hydraulic cylinders directly.

6. The hydraulic circuit in claim 2, wherein the flow of said hydraulic fluid that is exiting any individual said hydraulic pump and motor combination is selectively retained or discarded, and said retained flow is added directly to the respective hydraulic cylinder that is causing the function of that particular motor(s)/pump(s) combination.

7. The hydraulic circuit in claim 2, wherein the said one or more hydraulic pumps are mechanically connected to the said one or more hydraulic motors to form a single unit acting in unison.

8. The hydraulic circuit in claim 1, wherein a hydraulic accumulator does not provide pressurized fluid to said pumps or motors.

9. The hydraulic circuit in claim 2, wherein the said hydraulic fluid that is entering the said one or more hydraulic pumps which is coupled to the said one or more hydraulic motors are at tank pressure.

10. The hydraulic circuit in claim 2, wherein the said one or more hydraulic cylinders is two identical hydraulic cylinders, and the said one or more hydraulic motors is one hydraulic motor per hydraulic cylinder.

11. The hydraulic circuit in claim 10, where each of the said identical hydraulic cylinders have associated flow control devices, pumps and motors, and said devices, pumps and motors are identical or substantially identical.

12. The hydraulic circuit in claim 2, wherein at least one of the said flow control devices is not a single device but a plurality of devices used to achieve the effect of a single flow control device.

13. The hydraulic circuit in claim 1, wherein the rotation of said one or more hydraulic motors is exclusively caused by expulsion of fluid from said hydraulic cylinders.

14. The hydraulic circuit in claim 13 wherein all of the said hydraulic pumps and motors are a fixed-displacement type.

15. The hydraulic circuit in claim 14 wherein the at least one hydraulic motor is rotated by fluid expelled exclusively from a rod-side of said hydraulic cylinder.

16. The hydraulic circuit in claim 15, wherein the three or more flow rates of said fluid that is retained or combined is specifically either four or five flow rates.

17. The hydraulic circuit in claim 16, wherein the hydraulic fluid entering the said one or more hydraulic pumps which are coupled to the said one or more hydraulic motors is at tank pressure.

* * * * *